United States Patent
Simmons

[11] 3,719,128
[45] March 6, 1973

[54] SHIFTABLE LIGHT MASK FOR CAMERA LENS

[76] Inventor: Roger R. Simmons, 2515 Yale, Alamogordo, N. Mex. 88310

[22] Filed: April 19, 1971

[21] Appl. No.: 135,097

[52] U.S. Cl. ................................................95/36
[51] Int. Cl. ............................................G03b 19/02
[58] Field of Search..........................................95/36

[56] References Cited

UNITED STATES PATENTS 3,122,077  2/1964  Splendore ................................95/36
1,533,433  4/1925  Linden ....................................95/36

*Primary Examiner*—John M. Horan
*Attorney*—Clarence A. O'Brien and Harvey B. Jacobson

[57] ABSTRACT

A structure basically resembling a lens cap and releasably frictionally engagable over the lens barrel of a particular design of camera. The end wall is, however, provided with a slightly less than one-quarter sector opening for registry with a one-quarter sector of the associated camera lens. The structure is designed for adjustable rotation relative to the associated lens barrel and the opening in the end wall thereof may therefore be successively registered with four one-quarter sectors of the associated lens so that the lens may be effectively masked in a manner enabling a single frame of film to have the four corner portions thereof successively exposed with the result that each film frame may be utilized to produce four different photographs.

4 Claims, 4 Drawing Figures

PATENTED MAR 6 1973

3,719,128

Roger R. Simmons
INVENTOR

BY Clarence A. O'Brien
Harvey B. Jacobson

ATTORNEY 3,719,128

SHIFTABLE LIGHT MASK FOR CAMERA LENS

The light mask of the instant invention is constructed in generally the same manner as a conventional lens cover and includes a cylindrical body for frictional telescoping over a lens barrel and is provided with an end wall at one end for closely overlying the outer surface of the associated camera lens. However, the end wall of the instant invention is provided with a slightly smaller than one-quarter sector opening for registry with the associated lens in four successive 90° relatively rotated positions. In this manner, each film frame of the camera may be exposed four times.

The light mask of the instant invention has been specifically designed for use in conjunction with Polaroid cameras and also other cameras, with certain possible exceptions, when reasonably high speed film is used.

When at least reasonably high speed film is utilized in a Polaroid camera the lens of the camera is adjusted so as to have a much smaller lens aperture and accordingly, the depth of field of the camera lens is increased. Also, the lens structure of Polaroid cameras is such that they may be focused properly on an object closely spaced from the camera. In this manner, even an object disposed immediately in front of the Polaroid camera lens is at least in partial focus at the film plane. Of course, if very slow speed film is used in a camera and the shutter mechanism is properly adjusted for slow speed film to increase the lens aperture, the depth of field of the camera would be reduced due to the larger lens aperture and an object disposed immediately forwardly of the lens cannot be brought into even partial focus. Therefore, the light mask of the instant invention can be best utilized on cameras only when the cameras have reasonably high speed film therein.

The main object of this invention is to provide a light mask for the lens of a Polaroid camera and positionable on the Polaroid camera lens in successive 90° rotated positions relative thereto so as to enable four successive pictures to be taken with each film frame in the camera.

Another object of this invention, in accordance with the immediately preceding object, is to provide a light mask including portions thereof projecting radially therefrom and viewable when looking through the range finder of a Polaroid camera to indicate to the user of the camera that corner portion of the film frame and thus the range finder frame which is not masked and therefore in which corner portion of the range finder frame the subject of the picture must be registered in order to properly center the subject of the picture in that corner portion of the film frame to be exposed.

A final object of this invention to be specifically enumerated herein is to provide a shiftable light mask for a Polaroid camera lens in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
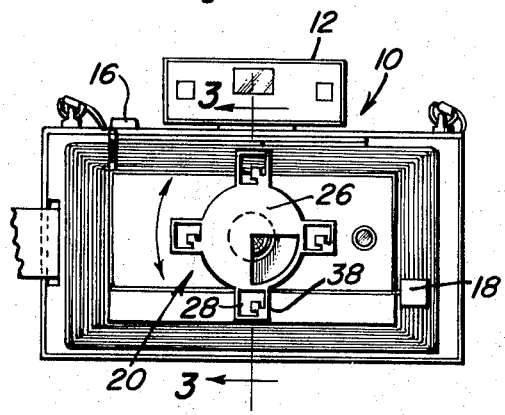
FIG. 1 is a front elevational view of a Polaroid camera with the light mask of the instant invention operatively associated with the lens of the camera.
Figure 2:
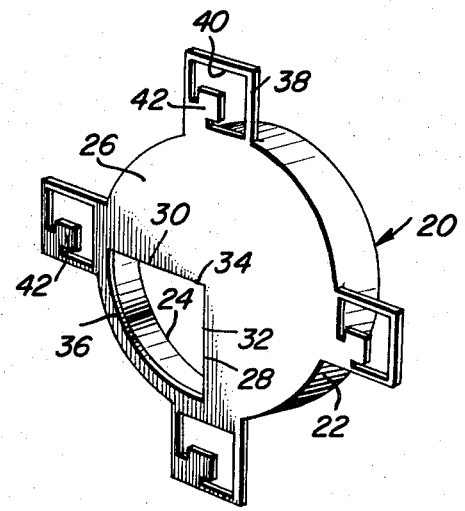
FIG. 2 is a perspective view of the light mask.
Figure 3:
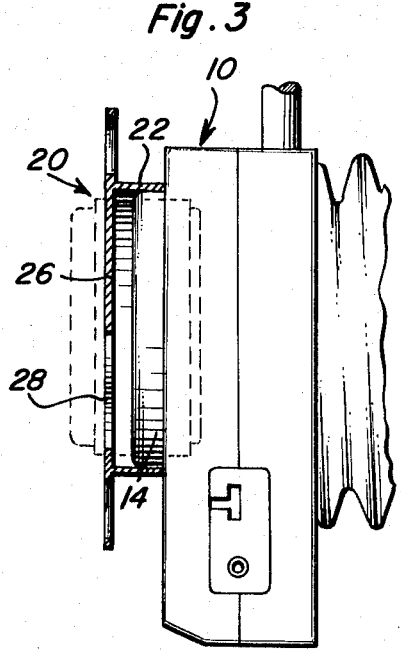
Figure 4:
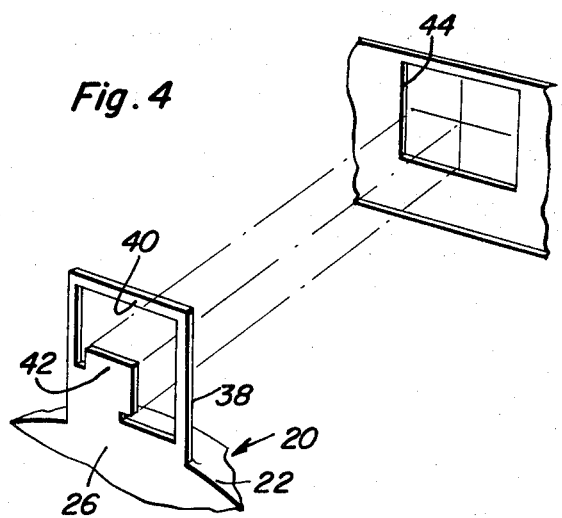

FIG. 3 is an enlarged fragmentary vertical sectional view taken substantially upon the plane indicated by the section line 3—3 of FIG. 1; and FIG. 4 is a fragmentary perspective view of one of the radially outwardly projecting peripheral portions of the light mask illustrating the manner in which the positioning of the cut out sector opening in the front wall of the light mask is indicated to the user of the camera in order that the subject of the picture to be taken may be properly centered in the proper sector of the range finder viewing frame.

Referring now more specifically to the drawings the numeral 10 generally designates a conventional form of Polaroid camera including a range finder 12 and lens barrel 14. In addition, the camera 10 includes a shutter release button 16 and a shutter cocking lever 18.

The light mask of the instant invention is referred to in general by the reference numeral 20 and comprises a generally cylindrical cap including a cylindrical body 22 open at one end as at 24 and partially closed at the other end by means of an end wall 26. The end wall 26 has a slightly less than one-quarter sector opening 28 formed therein and the opening 28 includes two right angled edges 30 and 32 intersecting at a point 34 slightly laterally spaced from the center axis of the body 22 and an arcuate edge 36 extending between the ends of the edges 30 and 32 remote from the point 34 and having the center axis of the body 22 as its center of curvature. The point 34 is spaced laterally of the center axis of the body 22 along a radius thereof bisecting the arcuate edge 36 and accordingly, light passing through the opening 28 and rearwardly through the lens barrel 14 is focused on the diagonally opposite quarter sector of the film plane of the camera 10.

The light mask 20 further includes four generally square radially outwardly projecting tabs 38 and each tab 38 includes a generally square opening 40 therein with a square tab element 42 projecting inwardly from the corner portion of the opening 40 corresponding to the positioning of the opening 28 formed in the end wall 26 of the light mask 20.

In operation, the light mask 20 is frictionally telescoped over the lens barrel 14 with one of the tabs 38 disposed uppermost and the sides of the uppermost tab 38 disposed vertically when the camera 10 is held in a horizontal position such as that illustrated in FIG. 1 of the drawings. Then, as the user of the camera 10 views through the range or view finder 12, he can visually ascertain whether the upstanding sides of the uppermost tab 38 generally parallel the upstanding side edges of the viewing aperture of the range finder 12. If the tab side edges do not parallel the side edges of the viewing aperture through which the user of the camera 10 is viewing the subject, the user of the camera 10 may slightly rotate the lens mask 20 on the lens barrel 14 in order to achieve the correct positioning of the lens mask 20 on the lens barrel 14. Then, the shutter cocking lever 18 may be depressed downwardly and the subject to be photographed may be centered in that corner portion of the viewing aperture corresponding to the corner portion of the opening 40 in which the tab element 42 is disposed. Thereafter, the shutter release button 16 may be depressed to take the first photograph. Thereafter, and without removing the film just exposed, the lens mask 20 may be rotated 90° in either direction and the cocking lever 18 may again be depressed. Then, the next subject to be photographed may be centered in the corner portion of the viewing aperture corresponding to the positioning of the tab element 42 of the next tab 38 positioned on top of the lens barrel 14 and the shutter release button 16 may be depressed to take the second picture. Thereafter, the lens mask 20 may be successively rotated 90° in the same direction so that the third and fourth pictures may be taken on a single sheet of film.

After all four pictures have been taken, the sheet film may be removed from the camera 10 in a conventional manner and four additional photographs may be taken on the next sheet of film.

In FIG. 4 of the drawings it may be seen that the positioning of each tab element 42 may be utilized to determine in which corner portion of the range finder viewing aperture 44 the subject to be photographed should be centered. Accordingly, and if the user of the camera will always take the first picture with the tab element 42 registered with the 12 through 3 o'clock corner portion of the viewing aperture 44, the user of the camera will always be able to determine how many quarter pictures have been taken and in which corner portion of the viewing aperture 44 the next subject to be photographed should be centered. Of course, if the first photograph of each group of four photographs is taken with the tab element 42 disposed in the 12 through 3 o'clock position and the light mask 20 is always rotated in a clockwise direction as viewed from the rear of the camera, little difficulty will be encountered in assuring that the proper corner portions of each sheet of film will be successively exposed.

As hereinbefore set forth, the lens mask 20 has been found to operate effectively when utilized in conjunction with reasonably high speed film.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a camera lens assembly of the type having a forwardly projecting lens barrel and operatively associated with a camera construction of the type enabling multiple exposures of a single frame of film within the camera, a light shielding cap including peripheral wall portions telescoped over the front of said lens barrel for support of said cap therefrom, said cap including a transverse opaque front wall registered with and overlying the front end of said lens barrel, said front wall having an opening formed therein in one corner sector thereof defined by the intersection of right angled diameters of the center axis of said lens barrel, said opening including edge portions thereof extending generally along said diameters, said cap including four circumferentially spaced and radially outwardly projecting tabs thereon, said tabs each including at least one straight edge portion thereof that parallels one of said generally straight edge portions of said opening, said cap including four circumferentially spaced and radially outwardly projecting tabs thereon, said tabs each including a rectangular opening therein with visually ascertainable means indicating corner portions of said rectangular openings corresponding to the sector positioning of said front wall opening, the sides of said rectangular openings generally paralleling said diameters.

2. The combination of claim 1 wherein said visually ascertainable means comprise generally rectangular tab elements supported within said corresponding corner portions.

3. The combination of claim 2 wherein said camera includes a view finder window through which the operator of the camera may view the area aligned with the center axis of said lens barrel, one of said tabs being viewable through said window.

4. A cap for disposition over the front end of a camera lens barrel, said cap including an opaque front wall for registry with and overlying the front end of said barrel, said front wall having an opening formed therein in one corner sector thereof defined by the intersection of right angled diameters of said cap, said opening including generally straight edge portions thereof generally paralleling and at least slightly spaced from said diameters, said cap including four circumferentially spaced and radially outwardly projecting tabs thereon, said tabs each including a rectangular opening therein with visually ascertainable means indicating corner portions of said rectangular openings corresponding to the sector positioning of said front wall opening, the sides of said rectangular openings paralleling said diameters.

* * * * *